United States Patent
Carver et al.

(10) Patent No.: US 12,109,561 B2
(45) Date of Patent: Oct. 8, 2024

(54) SUPPORT STRUCTURE FOR STRUCTURED CATALYST PACKINGS

(71) Applicant: ZONEFLOW REACTOR TECHNOLOGIES, LLC, Windsor, CT (US)

(72) Inventors: Jared Carver, South Hadley, MA (US); Jonathan Jay Feinstein, Windsor, CT (US); James Bruce Boisture, Windsor, CT (US)

(73) Assignee: ZoneFlow Reactor Technologies, LLC, Windsor, CT (US)

( * ) Notice: Subject to any disclaimer, the term of this patent is extended or adjusted under 35 U.S.C. 154(b) by 0 days.

(21) Appl. No.: 17/929,478

(22) Filed: Sep. 2, 2022

(65) Prior Publication Data

US 2023/0241569 A1   Aug. 3, 2023

Related U.S. Application Data

(63) Continuation of application No. 17/153,790, filed on Jan. 20, 2021, now Pat. No. 11,433,367.
(Continued)

(51) Int. Cl.
*B01J 8/06* (2006.01)
*B01J 8/02* (2006.01)
(Continued)

(52) U.S. Cl.
CPC ........... *B01J 8/0257* (2013.01); *B01J 8/0469* (2013.01); *B01J 8/06* (2013.01); *B01J 19/2415* (2013.01); *B01J 19/244* (2013.01); *B01J 19/32* (2013.01); *B01J 19/249* (2013.01); *B01J 35/56* (2024.01); *B01J 2219/2477* (2013.01); *B01J 2219/32275* (2013.01); *B01J 2219/32466* (2013.01)

(58) Field of Classification Search
None
See application file for complete search history.

(56) References Cited

U.S. PATENT DOCUMENTS

| | | | |
|---|---|---|---|
| 4,946,822 A | * | 8/1990 | Swars .................... F01N 3/281 502/527.22 |
| 6,217,832 B1 | | 4/2001 | Betta et al. |

(Continued)

FOREIGN PATENT DOCUMENTS

| | | |
|---|---|---|
| CN | 108854862 A | 11/2018 |
| EP | 2651548 B1 | 3/2018 |

(Continued)

*Primary Examiner* — Jennifer A Leung
(74) *Attorney, Agent, or Firm* — Knobbe, Martens, Olson & Bear LLP

(57) ABSTRACT

A support structure for a structured catalytic packing is disclosed. The support structure is in a fixed position relative to the reactor tube containing it. It supports catalyzed casings that are free to move relative to the support structure. The support structure and casings are inserted in the reactor tube such that the support structure is located proximate the longitudinal axis of the tube and the casings are located between the support structure and the reactor tube wall. The support structure comprises a central support tube or rod proximate to, and impervious or perforated discs perpendicular to, the longitudinal axis of the reactor tube, and may comprise spacers separating the discs.

22 Claims, 2 Drawing Sheets

Related U.S. Application Data

(60) Provisional application No. 62/964,007, filed on Jan. 21, 2020.

(51) Int. Cl.
 *B01J 8/04* (2006.01)
 *B01J 19/24* (2006.01)
 *B01J 19/32* (2006.01)
 B01J 35/56 (2024.01)

(56) References Cited

U.S. PATENT DOCUMENTS

| | | | |
|---|---|---|---|
| 6,288,008 B1 * | 9/2001 | Matsumoto | B01J 35/56 502/527.22 |
| 11,433,367 B2 * | 9/2022 | Carver | B01J 19/244 |
| 2014/0205506 A1 * | 7/2014 | Whittenberger | B01J 8/0242 422/129 |
| 2016/0243516 A1 | 8/2016 | Williams et al. | |
| 2019/0233284 A1 * | 8/2019 | Farace | C01B 3/384 |
| 2019/0275494 A1 * | 9/2019 | Ulber | B01J 19/246 |

FOREIGN PATENT DOCUMENTS

| | | | | |
|---|---|---|---|---|
| FR | 2061729 A1 * | 6/1971 | | B01J 19/30 |
| WO | WO 96-15850 A1 | 5/1996 | | |
| WO | WO-2018077969 A1 * | 5/2018 | | B01J 8/0257 |

\* cited by examiner

Fig. 2A
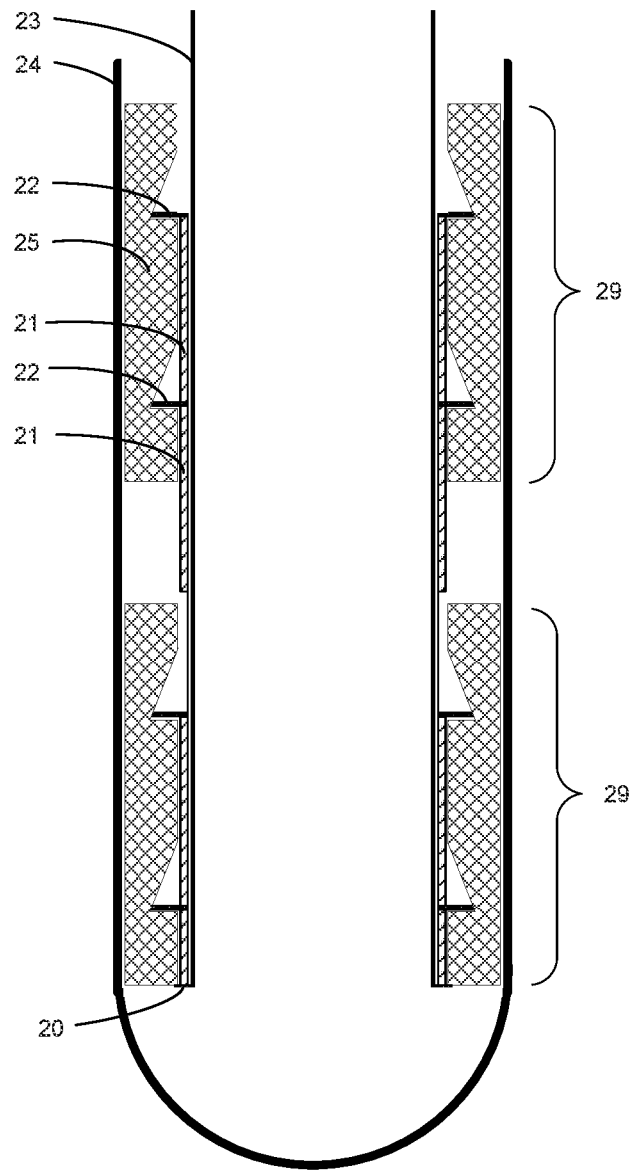
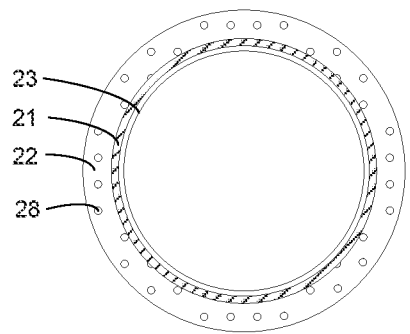
Fig. 2B
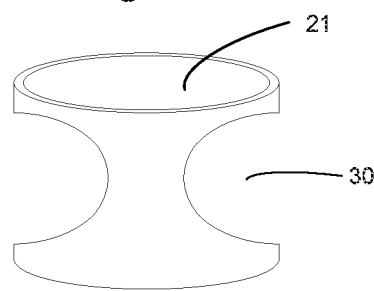
Fig. 2C

SUPPORT STRUCTURE FOR STRUCTURED CATALYST PACKINGS

INCORPORATION BY REFERENCE TO ANY PRIORITY APPLICATIONS

This application is a continuation of U.S. application Ser. No. 17/153,790, filed Jan. 20, 2021, titled SUPPORT STRUCTURE FOR STRUCTURED CATALYST PACKINGS, which claims the benefit of U.S. Provisional Application Ser. No. 62/964,007, filed Jan. 21, 2020, titled SUPPORT STRUCTURE FOR STRUCTURED CATALYST PACKINGS, both of which are hereby incorporated by reference herein in their entirety.

FIELD

The present disclosure relates to catalytic packings, and more particularly to support structures for a structured catalytic packing.

SUMMARY

In a first aspect, a catalyst module for a reactor tube, the catalyst module comprising an annular structure comprising a catalyst, and a support structure at least partially disposed within the annular structure, the support structure comprising one or more discs in a fixed position relative to the reactor tube, each of the one or more discs comprising a flat peripheral section that is perpendicular to an axis of the reactor tube.

In some embodiments, the one or more discs are impervious. In some embodiments, the one or more discs are permeable. In some embodiments, the flat peripheral section is permeable, each of the one or more disks further comprising an impervious flat central section. In some embodiments, the one or more discs comprise a plurality of discs, wherein at least one disc of the plurality of disks has a diameter different from a diameter of at least one other disc of the plurality of discs. In some embodiments, the one or more discs comprise a plurality of discs separated from one another by spacers, the discs and spacers being disposed around a central support tube or a guide rod. In some embodiments, the spacers comprise walls having openings extending therethrough. In some embodiments, the one or more discs are attached directly to a central support tube or a guide rod. In some embodiments, each of the one or more disks further comprises a flat central section offset relative to the flat peripheral section along the axis of the reactor tube. In some embodiments, the flat peripheral section extends at least partially into a cutout within an interior side of the annular structure.

In a second aspect, a catalytic reactor comprises a reactor tube oriented along an axis and at least one catalyst module. The at least one catalyst module comprises an annular structure comprising a catalyst, the annular structure disposed coaxially within the reactor tube; and a support structure at least partially disposed within the annular structure, the support structure comprising one or more discs in a fixed position relative to the reactor tube, each of the one or more discs comprising a flat peripheral section that is perpendicular to the axis of the reactor tube.

In some embodiments, the at least one catalyst module comprises a plurality of catalyst modules stacked along the axis of the reactor tube. In some embodiments, the one or more discs are permeable. In some embodiments, the flat peripheral section is permeable, each of the one or more disks further comprising an impervious flat central section. In some embodiments, the one or more discs comprise a plurality of discs, wherein at least one disc of the plurality of disks has a diameter different from a diameter of at least one other disc of the plurality of discs. In some embodiments, the one or more discs comprise a plurality of discs separated from one another by spacers, the discs and spacers being disposed around a central support tube or a guide rod. In some embodiments, the spacers comprise walls having openings extending therethrough. In some embodiments, the one or more discs are attached directly to a central support tube or a guide rod. In some embodiments, each of the one or more disks further comprises a flat central section offset relative to the flat peripheral section along the axis of the reactor tube. In some embodiments, the annular structure comprises a dynamic packing which is movably positioned between the support structure and the reactor tube.

BRIEF DESCRIPTION OF THE DRAWINGS

FIG. 2A is a longitudinal projection of an example embodiment of a support structure.

FIG. 2B is a plan view of a disc of the embodiment of FIG. 2A.

FIG. 2C is a longitudinal projection of a spacer of the embodiment of FIG. 2A.

DETAILED DESCRIPTION

Figure 1A:
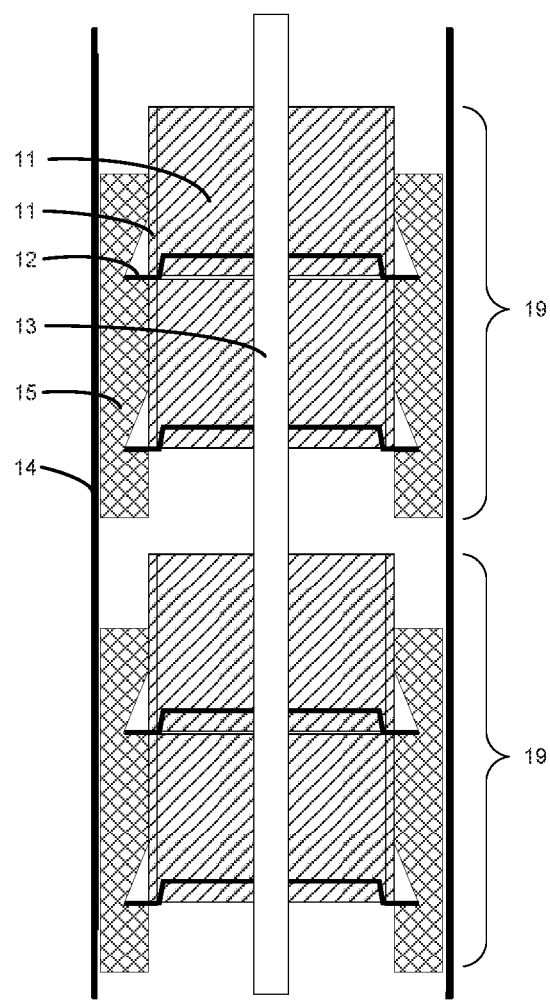
FIG. 1A is a longitudinal projection of an example embodiment of a support structure.

In steam methane reforming (or "SMR") processes, a hydrocarbon and steam and/or carbon dioxide can be reacted, or "reformed," in the presence of a catalyst to produce hydrogen mixed with oxides of carbon, the product gas being called "synthesis gas" or "syngas." The reforming and reformed gases and the catalyst are contained in reactor vessels, typically high-temperature steel alloy reactor tubes. (Such vessels are herein referred to as "tubes" but may have a circular or any other cross-sectional shape.) The catalyst has conventionally been supplied as ceramic pellets impregnated with metallic catalysts.

The catalyst may also be provided, however, by placing catalyst-coated structured packings within the reactor tubes. Such structured packings may comprise rigid or flexible structures made from metal, ceramics, or other materials in the form of plates, wires, or other shapes, in each case containing or coated with an appropriate catalyst. These packings may be uniform across the entire cross-section of the reactor tube, or may consist of a catalyst-bearing reactor casing resting on a support structure (or "dynamic structured packing").

In a dynamic structured packing, the reactor casing is free to move relative to the support structure, which itself is fixed in position relative to the reactor tube in which the packing is placed. The packing is inserted in the reactor tube such that the support structure (which may or may not be catalyst bearing) is located proximate the axis, and the reactor casing is located between the support structure and the reactor wall. The reactor casing contains passages to direct the flow of a fluid through the casing and contains a catalyst. The support structure not only supports the reactor casing but also allows the casing to move along the support structure, improving the process results. In some embodiments, such as a single-pass reactor, a dynamic structured packing is used to create an annular reactor in which the reforming and reformed gases flow into the reactor tube at one end of the tube, flow through the annulus between the support structure and the reactor tube wall, and exit at the other end of the tube. In other embodiments, such as a heat recuperator (bayonet) reactor, the gas passes through the annulus formed by the structured packing from a first end of the reactor tube to a second end and then returns through a smaller central tube to exit the tube at the first end.

As previously practiced, support structures in dynamic structured packings have been provided with surfaces oblique to the reactor tube wall, along which surfaces (or the edges of such surfaces) the casings could move. Providing such oblique surfaces, in the form of nesting cones, frusto-conical shapes attached to a central tube or rod, or by some other method, however, entails expensive manufacturing processes and materials. It is therefore desirable to discover a more economical support structure with the same functionality as previously known support structures.

The reactor tubes used in the SMR process are 8 meters to 12 meters in length, mounted vertically, with an inside diameter of 85 mm to 125 mm, and in some applications, up to 250 mm. To facilitate the introduction of structured packings into such tubes, the structured packings may be provided in modules with a length of 100 mm to 250 mm, and sometimes up to 500 mm or more. Once inserted into the reactor tubes, such modules stack one atop the other. When modules of a dynamic structured packing are used in a single-pass reactor tube, the heat to drive the reforming reaction is provided only through the reactor tube wall. Other than its effect on pressure drop across the reforming tube, as described below, the support structure has little or no effect on the amount of heat transferred into the reforming gases or on other aspects of the operation of the reactor and need not accommodate itself to any other structure within the reactor tube.

With bayonet reactors, however, the situation is different. In such a reactor, the reforming gases typically enter the reactor tube at one end, transit the length of the tube in an annulus in which they are reformed, and reach the closed opposite end of the reactor tube, with the reformed gas then returning through the smaller central tube to exit at the same end though which the reforming gases entered. In these reactors, heat is advantageously recovered from the reformed gases in the central return tube to the gas in the annulus to provide heat to the reforming reactions occurring there. In a bayonet reactor, the central return tube must be continuous for the length of the reactor tube so that it effectively separates the syngas flowing through it from the gas in the annulus. The modular support structure for a dynamic structured packing used in the annulus of a bayonet reactor tube must therefore accommodate such a continuous central return tube. The support structure additionally must do so without unduly hindering the transfer of heat from gas in the central return tube to the reforming gases in the annulus of the reactor tube. It is therefore desirable to discover a support structure for dynamic structured packings that can be provided as part of such packings and can also accommodate the continuous central tube of a bayonet reactor without hindering heat transfer from the central tube to the annulus of the reactor tube.

The SMR reactions, and other reactions, can take place at high temperatures. For this reason, the reactor tubes are typically contained in a furnace that provides heat to the process, and efficient transfer of heat from the furnace to the reforming gases is important. The SMR reaction, moreover, is strongly endothermic, making efficient heat transfer that much more essential. Catalytic structures (pellets or structured packings) that better promote the transfer of heat from the furnace through the tube walls to the reforming gases—that is, that have high heat transfer coefficients—are therefore desirable. Altering the shape of a catalytic structure to increase its heat transfer coefficient will also increase the pressure drop across the reactor tube. Excessive pressure drop can hinder or make more expensive the various processes conducted downstream of the SMR process. For this reason, it is desirable for any catalytic structure, including a structured packing, to improve or optimize the trade-off between heat transfer and pressure drop. Moreover, the most appropriate such trade-off may vary with the detailed configuration of the particular SMR plant and/or the exact nature and design of the downstream process(es). For example, the gas velocity and the relative values of a high heat transfer coefficient and a low pressure drop may dictate different design optima.

The trade-off between heat transfer and pressure drop for dynamic structured packings can be altered by changing the detailed shape of the reactor casing. Such alterations, however, often entail expensive, time-consuming changes to the equipment used to manufacture the complex configurations of the casings. Therefore, embodiments of the current disclosure can provide advantages including a more economical approach to adjusting the trade-off between heat transfer and pressure drop in such structured packings for diverse conditions.

Accordingly, some embodiments of the present disclosure can advantageously reduce the complexity and cost of the support structure in a dynamic structured packing.

Embodiments of the present disclosure may further provide a support structure in such a dynamic structured packing that better accommodates the special requirements of implementing such a packing in the annulus of a bayonet SMR reactor tube.

The present technology may reduce the time and expense of changing the heat transfer coefficient and related pressure drop of a dynamic structured packing.

These and other objectives can be realized by embodiments of the present disclosure. For example, some embodiments provide a support structure having discs perpendicular to the reactor tube axis, which discs may be either impervious or permeable. As used herein, the term "disc" can include any sheet or structure such as a metal sheet or structure conforming to the cross-sectional shape of the reactor tube and having an area perpendicular to the reactor axis at and near its outer edge. The discs may be separated by varying intervals by spacers and guided into place by a central guide rod or tube or may be attached directly to a central support tube at varying intervals. The walls of the spacers may be solid, perforated, or partially removed to facilitate heat transfer from gas in the central return tube to gas in the annulus of a bayonet reactor.

FIG. 1A is a longitudinal projection of repeating portions of an embodiment of the present disclosure. The embodiment of FIG. 1A depicts a structure for a single-pass reactor tube. A support structure comprising tubular spacers 11 (shown with slashes), discs 12 (shown solid black), and a central guide rod 13 is disposed within reactor tube 14. The rod is preferably continuous for the entire length of the reactor tube, may have a circular or other cross-section, is of a metal alloy chosen for its thermal expansion coefficient similar to that of the reactor tube and its ability to tolerate the harsh conditions within the reactor tube during operation (for example, Incoloy 800H/HT), and is advantageously between ¼" and 1" in diameter. In one embodiment the guide rod, spacers, and discs are enclosed within an annular structure 15 (shown cross-hatched), such as a catalyzed casing or other structure comprising a catalyst, which structure resides between the support structure and the tube. The annular structure encompasses a stack of spacers and discs to form a module 19 for insertion into the reactor tube 14. A module 19 comprises at least one annular structure 15, spacer 11, and disc 12. In some embodiments, a module 19 comprises a plurality of annular structures 15, a plurality of spacers 11, and/or a plurality of discs 12. The height of a module may be of any size. In some embodiments, a height of 100 mm to 500 mm may advantageously improve the process of inserting the modules into the reactor tube and later removing them. The annular structure, typically a catalyzed casing formed from metal sheet and wrapped around the support structure, may be held in place during insertion either by interlocking or otherwise attaching its ends or by holding it in place with string, twine, or other retainers that may later volatize in the hot reactor tube. In some embodiments, a lower portion of the annular structure 15 may extend below the lowest disc 12 of the module 19 and may be arranged to receive an upper portion of a spacer 11 of an adjacent module 19 therein.

Figure 1B:
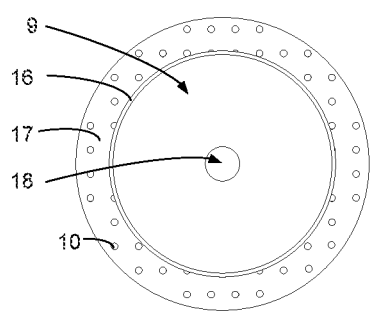
FIG. 1B is a plan view of a disc of the embodiment of FIG. 1A.

Referring to FIG. 1B showing detail of a disc 12 of FIG. 1A, in some embodiments the disc may generally have a top hat shape, having an elevated (or depressed) preferably flat central section 9, a transition section 16 transitioning from the elevation of the central section to a flat peripheral section 17 at a different elevation from the central section, and a central hole 18 through which the central rod of FIG. 1A extends. The peripheral section of the discs may have perforations 10 or be otherwise permeable. In some embodiments, a portion of the discs 12, such as the peripheral section 17, may comprise a catalyst.

Figure 1C:
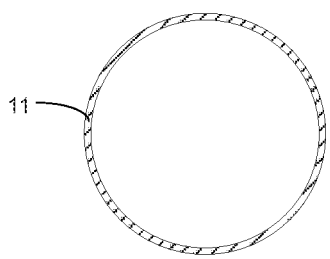
FIG. 1C is a plan view of a spacer of the embodiment of FIG. 1A.

FIG. 1C shows the circular cross section of a spacer 11 of FIG. 1A. The spacer is preferably made of the same metal alloy as the discs or may comprise a different material. Each spacer 11 rests on the disc 12 below it as shown in FIG. 1A.

In one example assembly method, the central guide rod 13 is first inserted into the reactor tube, and the modules are successively fitted onto the central guide rod using the hole in the center of each disc and guided into the reactor tube 14. The first or lowest inserted module rests on a grate (not shown) or other suitably pervious support at the lower end of the reactor tube. Successive modules then rest one atop the other.

FIG. 2A is a longitudinal cross section of another embodiment of the present disclosure shown in conjunction with a bayonet reactor. In this embodiment, the support structure comprises spacers 21 (shown with slashes), flat discs 22 (shown solid black), and a central tube 23 all disposed within a reactor tube 24. The central tube is continuous, extending along substantially the entire length of the reactor tube. Annular structures 25 (shown cross-hatched), for example, catalyzed casings, reside between the support structure and reactor tube. One casing and the support structures associated with it constitute a module 29. Ring 20 is attached to the bottom of the central tube to retain or support the bottommost spacer. FIG. 2B, a plan view of a spacer and disc of FIG. 2A, shows that the spacers 21 and discs 22 are open in the center to encompass a central tube 23 with as little clearance as possible between themselves and the central tube. The discs may have perforations 28 or be otherwise permeable. Materials selection may be as described for the embodiment of FIGS. 1A-1C. FIG. 2B is an orthogonal view of a spacer 21 of FIG. 1A, showing regions 30 in which portions of its tubular wall are removed.

Modules 29, comprising discs 22, spacers 21, and an annular structure 25, are assembled and positioned along the length of the central tube 23. The central tube 23 may be inserted into the reactor tube together with the modules. In some embodiments, the central tube 23 may be welded to the inlet and outlet fixtures. In some example assembly methods, it may be more convenient to weld the central tube 23 to the inlet and outlet fixtures prior to inserting the modules 29 into the reactor tube 24.

In some embodiments, the discs are joined to the guide rod 13 of FIG. 1A or a central tube 23 of FIG. 2A such as by welding, brazing, or mechanical bonding, and the spacers may be omitted. In this example embodiment, the discs can be attached such as by welding directly to the guide rod 13 or central tube 23 without the spacers. The advantageous simplicity of a flat disc perpendicular to the reactor tube axis as compared to a structure with a surface oblique to the reactor tube axis is retained in this embodiment. Such an arrangement may entail a more complex and expensive manufacturing process such as welding the discs to the central support tube or affixing them there with screws or rivets.

In a bayonet reactor heat may be transmitted from hot, reformed gases passing through the central tube to the cooler, unreformed gases flowing counter-currently through the annulus occupied by the catalyzed casing. For this purpose, the walls of spacers may be perforated or otherwise partially removed, as, for example, in FIG. 2C, to facilitate both the spacings between the discs and heat transfer between the fluids passing through the central tube and annulus. The shapes and sizes of openings in the wall of the spacers may be varied.

Embodiments of the present disclosure can be easily and inexpensively manufactured. Metal thicknesses for all components are selected to withstand the mechanical stresses imposed by steam methane reforming conditions. Discs may be stamped from flat steel stock. Guide rods and spacers may be cut to length from standard or custom tube or bar stock. One of skill in the art would know that embodiments of the current disclosure can advantageously reduce the complex, expensive forming and welding techniques and processes necessary to provide support structure surfaces oblique to the reactor tube wall and attach them to a central support column.

Tests have shown that the support structure embodiments disclosed herein improves reactor performance comparable to that of other structured SMR packings with supporting edges oblique to the reactor tube walls. Tests also showed that heat transfer coefficients and pressure drops of dynamic structured packings in accordance with the present technology can be altered systematically by introducing more or fewer discs, or discs of varying outside diameters, per length of reactor tube, or by varying the diameter of the spacers and central tube. By testing it was also learned that by adding an increasing number of perforations to the discs, the pressure drop and heat transfer coefficient of the structured SMR packing could both be systematically reduced.

Adding more or fewer discs, discs or spacers of varying diameters, or more or fewer perforations to the discs of a support structure in accordance with the present technology allows for adjustment of the heat transfer coefficient and pressure drop of the structured packing to improve or optimize its performance. Such adjustments avoid the alternative approach of time-consuming and expensive alterations to the more complex outer structure in the structured packing. Modification of the number of discs and/or perforation pattern can therefore be used to improve or optimize efficiently the performance of a structured packing for a variety of applications and therefore to permit the use without alteration of the reactor casing for the various application requirements.

Other advantages and other embodiments of the current invention will be obvious to those skilled in the art. Their omission here is not intended to exclude them from the claims advanced herein.

Although the present invention has been described in terms of certain preferred embodiments, various features of separate embodiments can be combined to form additional embodiments not expressly described. Moreover, other embodiments apparent to those of ordinary skill in the art after reading this disclosure are also within the scope of this disclosure. Furthermore, not all the features, aspects and advantages are necessarily required to practice the present technology. Thus, while the above detailed description has shown, described, and pointed out novel features of the present technology as applied to various embodiments, it will be understood that various omissions, substitutions, and changes in the form and details of the apparatus or process illustrated may be made by those of ordinary skill in the technology without departing from the spirit or scope of the present disclosure. The present technology may be embodied in other specific forms not explicitly described herein. The embodiments described above are to be considered in all respects as illustrative only and not restrictive in any manner.

What is claimed is:

1. A catalyst module for a reactor tube, the catalyst module comprising:
    an annular structure comprising a catalyst; and
    a support structure at least partially disposed within the annular structure, the support structure comprising one or more flat structures extending at least partially into a cutout within an interior side of the annular structure, wherein the one or more flat structures comprise a catalyst.

2. The catalyst module of claim 1, wherein the one or more flat structures are impervious.

3. The catalyst module of claim 1, wherein the one or more flat structures are permeable.

4. The catalyst module of claim 1, wherein the one or more flat structures are attached directly to a central support tube or a guide rod.

5. The catalyst module of claim 4, wherein the one or more flat structures comprise a plurality of flat structures attached at varying intervals along the length of the central support tube or the guide rod.

6. The catalyst module of claim 1, wherein the one or more flat structures comprises a first subset of flat structures and a second subset of flat structures.

7. The catalyst module of claim 6, where the first subset of flat structures comprises a first perforation pattern and the second subset of flat structures comprises a second perforation pattern, wherein the first perforation pattern is different from the second perforation pattern.

8. A catalytic reactor comprising:
    a reactor tube oriented along an axis; and
    at least one catalyst module comprising:
        an annular structure comprising a catalyst, the annular structure disposed coaxially within the reactor tube; and
        a support structure at least partially disposed within the annular structure, the support structure comprising one or more flat structures extending at least partially into a cutout within an interior side of the annular structure, wherein the one or more flat structures comprise a catalyst.

9. The catalytic reactor of claim 8, wherein the annular structure is supported within the reactor tube by the support structure.

10. The catalytic reactor of claim 8, wherein the one or more flat structures are attached directly to a central support tube or a guide rod.

11. The catalytic reactor of claim 8, wherein the one or more flat structures are impervious.

12. The catalytic reactor of claim 8, wherein the one or more flat structures are permeable.

13. The catalytic reactor of claim 8, wherein the annular structure is movable relative to the support structure and the reactor tube.

14. The catalytic reactor of claim 8, wherein the one or more flat structures comprise a plurality of flat structures attached at varying intervals along the length of a central support tube or a guide rod.

15. The catalytic reactor of claim 8, wherein the one or more flat structures comprise:
    a first subset of flat structures attached to a first location of a central support tube; and
    a second subset of flat structures attached to a second location of the central support tube.

16. The catalytic reactor of claim 15, wherein the first subset of flat structures is of a first permeability and the second subset of flat structures is of a second permeability.

17. The catalytic reactor of claim 16, where the first permeability is different than the second permeability.

18. A catalyst module for a reactor tube, the catalyst module comprising:
    an annular structure comprising a catalyst; and
    a support structure at least partially disposed within the annular structure, the support structure comprising one or more flat structures extending at least partially into a cutout within an interior side of the annular structure, wherein the one or more flat structures are attached directly to a central support tube or a guide rod and comprise a plurality of flat structures attached at varying intervals along the length of the central support tube or the guide rod.

19. A catalyst module for a reactor tube, the catalyst module comprising:
    an annular structure comprising a catalyst; and
    a support structure at least partially disposed within the annular structure, the support structure comprising one or more flat structures extending at least partially into a cutout within an interior side of the annular structure, wherein the one or more flat structures comprises a first subset of flat structures and a second subset of flat structures, the first subset of flat structures comprising a first perforation pattern and the second subset of flat structures comprising a second perforation pattern, wherein the first perforation pattern is different from the second perforation pattern.

20. A catalytic reactor comprising:
    a reactor tube oriented along an axis; and
    at least one catalyst module comprising:
        an annular structure comprising a catalyst, the annular structure disposed coaxially within the reactor tube; and
        a support structure at least partially disposed within the annular structure, the support structure comprising one or more flat structures extending at least partially into a cutout within an interior side of the annular structure, wherein the one or more flat structures comprise a plurality of flat structures attached at varying intervals along the length of a central support tube or a guide rod.

21. A catalytic reactor comprising:
a reactor tube oriented along an axis; and
at least one catalyst module comprising:
an annular structure comprising a catalyst, the annular structure disposed coaxially within the reactor tube; and
a support structure at least partially disposed within the annular structure, the support structure comprising one or more flat structures extending at least partially into a cutout within an interior side of the annular structure, wherein the one or more flat structures comprise:
a first subset of flat structures attached to a first location of a central support tube; and
a second subset of flat structures attached to a second location of the central support tube,
wherein the first subset of flat structures is of a first permeability and the second subset of flat structures is of a second permeability.

22. The catalytic reactor of claim 21, where the first permeability is different than the second permeability.

* * * * *